(12) United States Patent
Lu (10) Patent No.: US 12,058,769 B2
(45) Date of Patent: Aug. 6, 2024

(54) CARRIER AGGREGATION RESTORATION

(71) Applicant: T-Mobile USA, Inc., Bellevue, WA (US)

(72) Inventor: Kun Lu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 412 days.

(21) Appl. No.: 17/557,301

(22) Filed: Dec. 21, 2021

(65) Prior Publication Data

US 2023/0199912 A1    Jun. 22, 2023

(51) Int. Cl.
| H04W 76/36 | (2018.01) |
| H04W 72/0453 | (2023.01) |
| H04W 72/23 | (2023.01) |
| H04W 72/541 | (2023.01) |
| H04W 76/19 | (2018.01) |
| H04W 88/06 | (2009.01) |

(52) U.S. Cl.
CPC ....... *H04W 76/36* (2018.02); *H04W 72/0453* (2013.01); *H04W 72/23* (2023.01); *H04W 72/541* (2023.01); *H04W 76/19* (2018.02); *H04W 88/06* (2013.01)

(58) Field of Classification Search
CPC . H04W 76/36; H04W 72/0453; H04W 72/23; H04W 72/541; H04W 76/19; H04W 88/06; H04W 76/34; H04W 76/15; H04W 36/36; H04W 36/30; H04W 36/14
See application file for complete search history.

(56) References Cited

U.S. PATENT DOCUMENTS

| 5,551,066 A | 8/1996 | Stillman et al. |
| 5,696,903 A | 12/1997 | Mahany |
| 6,728,514 B2 | 4/2004 | Bandeira et al. |
| 6,985,750 B1 | 1/2006 | Vicknair et al. |
| 7,680,073 B2 | 3/2010 | Jamieson et al. |
| 7,797,367 B1 | 9/2010 | Gelvin et al. |
| 8,989,140 B2 | 3/2015 | Zhang et al. |
| 9,288,742 B2 | 3/2016 | Etemad et al. |
| 9,674,852 B2 | 6/2017 | Heo et al. |

(Continued)

FOREIGN PATENT DOCUMENTS

| EP | 1693991 B1 | 7/2009 |
| EP | 3174329 B1 | 11/2020 |

(Continued)

*Primary Examiner* — Brian T O Connor
(74) *Attorney, Agent, or Firm* — Perkins Coie LLP (57) ABSTRACT

Systems and methods for facilitate wireless communication are disclosed. In one example aspect, a wireless communication device includes a processor that is configured to determine, for a user equipment that operates in a dual connectivity mode using a first frequency range associated with the device and a second frequency range associated with a secondary device, that a release of the secondary communication node has been triggered. The processor is configured to determine that the user equipment previously operated in a single connectivity mode using a carrier aggregation of two or more carriers in the first frequency range associated with the device and transmit a message to the user equipment to reconfigure the user equipment to use the carrier aggregation of two or more carriers in the first frequency range.

20 Claims, 9 Drawing Sheets

(56) References Cited

U.S. PATENT DOCUMENTS

| | | |
|---|---|---|
| 9,699,702 B2 | 7/2017 | Fujishiro et al. |
| 10,015,837 B2 | 7/2018 | Rahman et al. |
| 10,111,049 B2 | 10/2018 | Shauh et al. |
| 10,263,729 B2 | 4/2019 | Vikberg et al. |
| 10,321,308 B2 | 6/2019 | Deng et al. |
| 10,368,253 B2 | 7/2019 | Lei et al. |
| 10,405,345 B2 | 9/2019 | Lindoff et al. |
| 10,498,500 B2 | 12/2019 | Rahman et al. |
| 10,516,569 B2 | 12/2019 | Lindoff et al. |
| 10,531,508 B2 | 1/2020 | Wu |
| 11,871,294 B2 * | 1/2024 | Lu ................ H04W 36/36 |
| 2002/0122410 A1 | 9/2002 | Kulikov et al. |
| 2003/0102979 A1 | 6/2003 | Jednacz et al. |
| 2004/0092281 A1 | 5/2004 | Burchfiel |
| 2007/0109989 A1 | 5/2007 | Nakagawa et al. |
| 2010/0034163 A1 | 2/2010 | Damnjanovic et al. |
| 2010/0226342 A1 | 9/2010 | Schmidt et al. |
| 2013/0244656 A1 | 9/2013 | Heo et al. |
| 2014/0119263 A1 | 5/2014 | Shauh et al. |
| 2016/0056939 A1 | 2/2016 | Kim et al. |
| 2016/0057800 A1 | 2/2016 | Ingale et al. |
| 2017/0071023 A1 | 3/2017 | Kunz et al. |
| 2018/0270682 A1 | 9/2018 | Zacharias et al. |
| 2019/0373519 A1 | 12/2019 | Yiu et al. |
| 2019/0387569 A1 | 12/2019 | Martinez Tarradell et al. |
| 2020/0059991 A1 | 2/2020 | Wu |
| 2020/0107390 A1 | 4/2020 | Hwang et al. |
| 2021/0051592 A1 | 2/2021 | Wang et al. |
| 2021/0084543 A1 | 3/2021 | Wang et al. |

FOREIGN PATENT DOCUMENTS

| | | |
|---|---|---|
| WO | 2008135933 A2 | 11/2008 |
| WO | 2017030487 A1 | 2/2017 |

\* cited by examiner

CARRIER AGGREGATION RESTORATION

BACKGROUND

Mobile communication technologies are moving the world toward an increasingly connected and networked society. In the Fourth-Generation (4G)/Long-Term Evolution (LTE) wireless communication technology, Carrier aggregation (CA) has been used to increase the bandwidth, thereby increasing the bitrate for transmissions. In the Fifth-Generation (5G) New Radio (NR) wireless technology, a variety of different frequency bands and connectivity modes are used to provide wide coverage and large bandwidths.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Carrier Aggregation (CA) as well as dual- or multi-connectivity have been used in 5G wireless communication to provide coverage and large bandwidths. However, switching between dual-/multi-connectivity and single-connectivity (e.g., triggered by events such as User Equipment (UE) mobility), previously configured CA configuration may not be properly restored, leading to loss in bandwidth and transmission rates for the UE and thereby impacting user experience. This patent document discloses techniques that can ensure the proper restoration of CA configurations during single-connectivity and dual-/multi-connectivity switches, so as to ensure that the UE can fully leverage the available bandwidths for communications with the base stations/communication nodes.

In CA, each aggregated carrier is referred to as a component carrier (CC). Carrier aggregation can be either intra-band (the CCs belong to the same operating frequency band having one or more gaps) or inter-band (the CC belong to different operating frequency bands). In 5G communications, two different frequency ranges—frequency range 1 (FR1) and frequency range 2 (FR2)—are made available. The frequency bands in FR1 use many of the same frequency bands as those for 4G and other mobile communications cellular services. The frequency bands in FR2 include the operational frequencies that have been allocated in the mmWave region (above 24 GHz). These bands aim to provide high performance 5G as large amounts of bandwidths are available for use. Definition of the frequency ranges for FR1 and FR2 can be found in the Third-Generation Partnership Project (3GPP) standard.

TABLE 1

Definition of frequency ranges

| Frequency range designation | Corresponding frequency range |
|---|---|
| FR1 | 410 MHz-7125 MHz |
| FR2 | 24250 MHz-52600 MHz |

Figure 1:
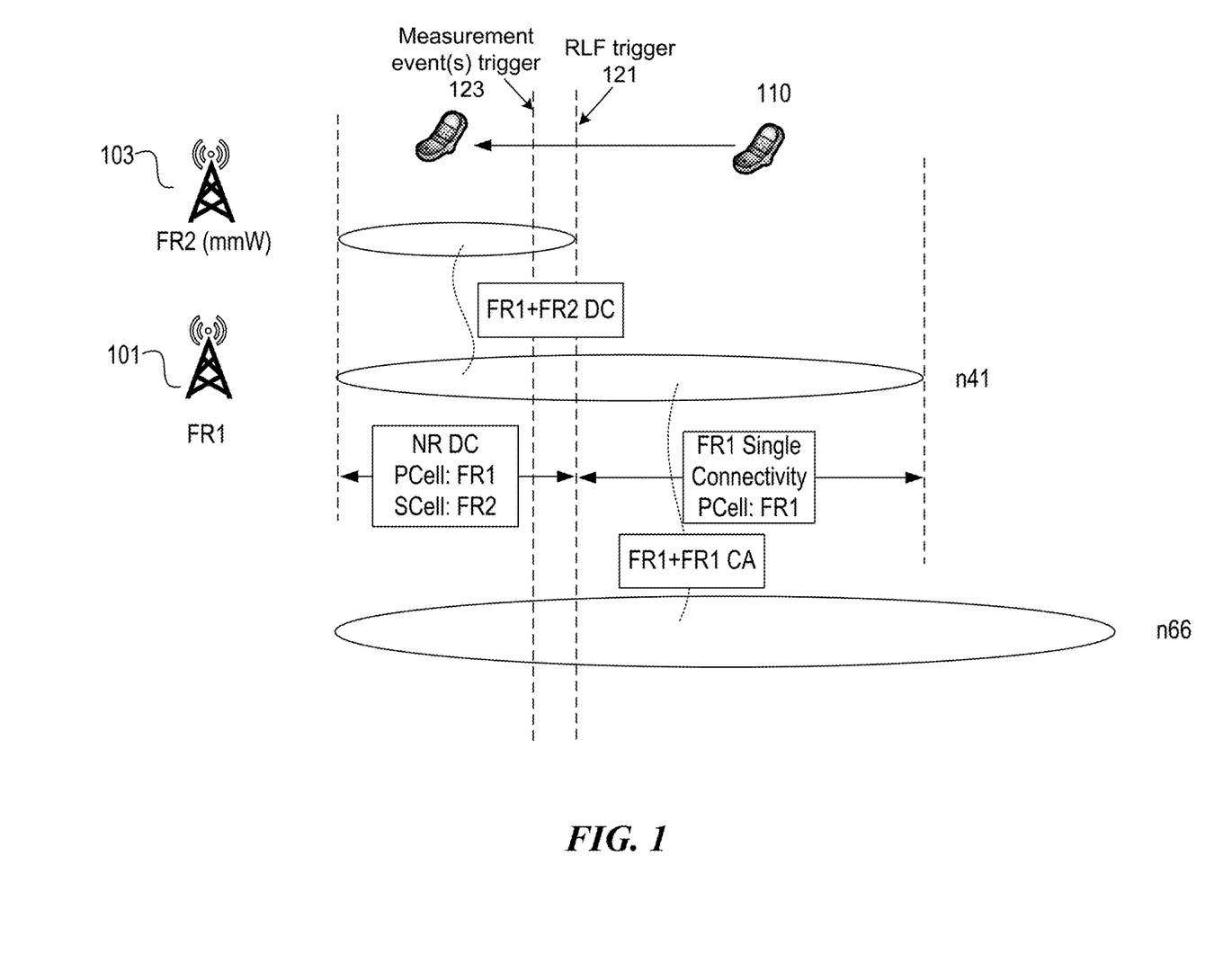
FIG. 1 illustrates an example of New Radio (NR) Dual Connectivity (DC) support for Frequency Range 1 (FR1)—Frequency Range 2 (FR2) DC in accordance with one or more embodiments of the present technology.

To best leverage both frequency ranges, the NR-NR Dual Connectivity (NR-DC) feature introduces support for FR1-FR2 Dual Connectivity for User Equipment (UE) that is connected to the 5G Core network (5GC). For example, the UE connects to the network via the FR1 Primary Cell (PCell) controlled by the Master Node (MN) 101. When positioned in the FR2 coverage, the UE can be configured with dual connectivity by adding a connection to the Secondary Node (SN) 103 on FR2. FIG. 1 illustrates an example of NR DC support for FR1-FR2 DC in accordance with one or more embodiments of the present technology. In this example, the MN 101 provides the Master Cell Group (MCG) on FR1 (PCell). The SN 103 provides the Secondary Cell Group (SCG) on FR2. When the UE 110 is out of the coverage of FR2, the UE is connected to the network using single connectivity on FR1, operating in one or more carriers using carrier aggregation. In this specific example, band n41 (TDD, 2496 MHz-2690 MHz for both uplink and downlink) is aggregated with band n66 (FDD, 1710 MHz-1780 MHz for uplink and 2610 MHz-2200 MHz for downlink).

Figure 2:
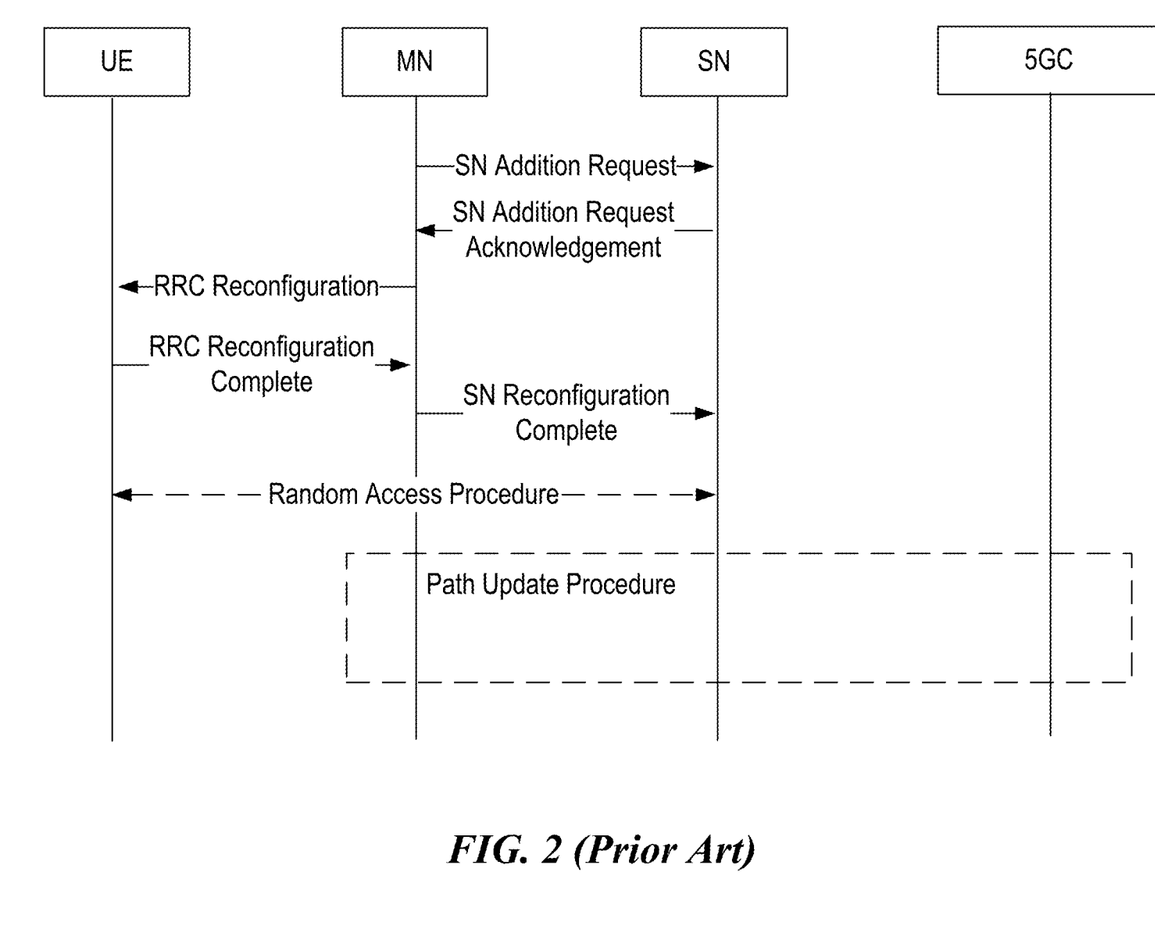
FIG. 2 illustrates an example sequence chart for a Secondary Node (SN) addition procedure.

When the UE moves within the FR2 coverage, the UE can be configured to add the SN to enable support for FR1-FR2 Dual Connectivity. FIG. 2 illustrates an example sequence chart for a Secondary Node (SN) addition procedure. The SN addition procedure is initiated by the MN to establish a UE context at the SN in order to provide resources from the SN to the UE. As shown in FIG. 2, the MN decides to request the target SN to allocate resources. The SN provides the new SCG radio resource configuration to the MN within an SN RRC configuration message contained in the SN Addition Request Acknowledge message. The MN sends to the UE the RRCConnectionReconfiguration message. The UE applies the new configuration and replies to MN with RRCConnectionReconfigurationComplete message. The MN informs the SN that the UE has completed the reconfiguration procedure successfully via ReconfigurationComplete message. If configured with bearers requiring SCG radio resources, the UE performs the Random Access procedure towards the SCG. If applicable, the update of the UP path towards the 5GC is performed. The UE then performs communication using FR1-FR2 Dual Connectivity.

Figure 3A:
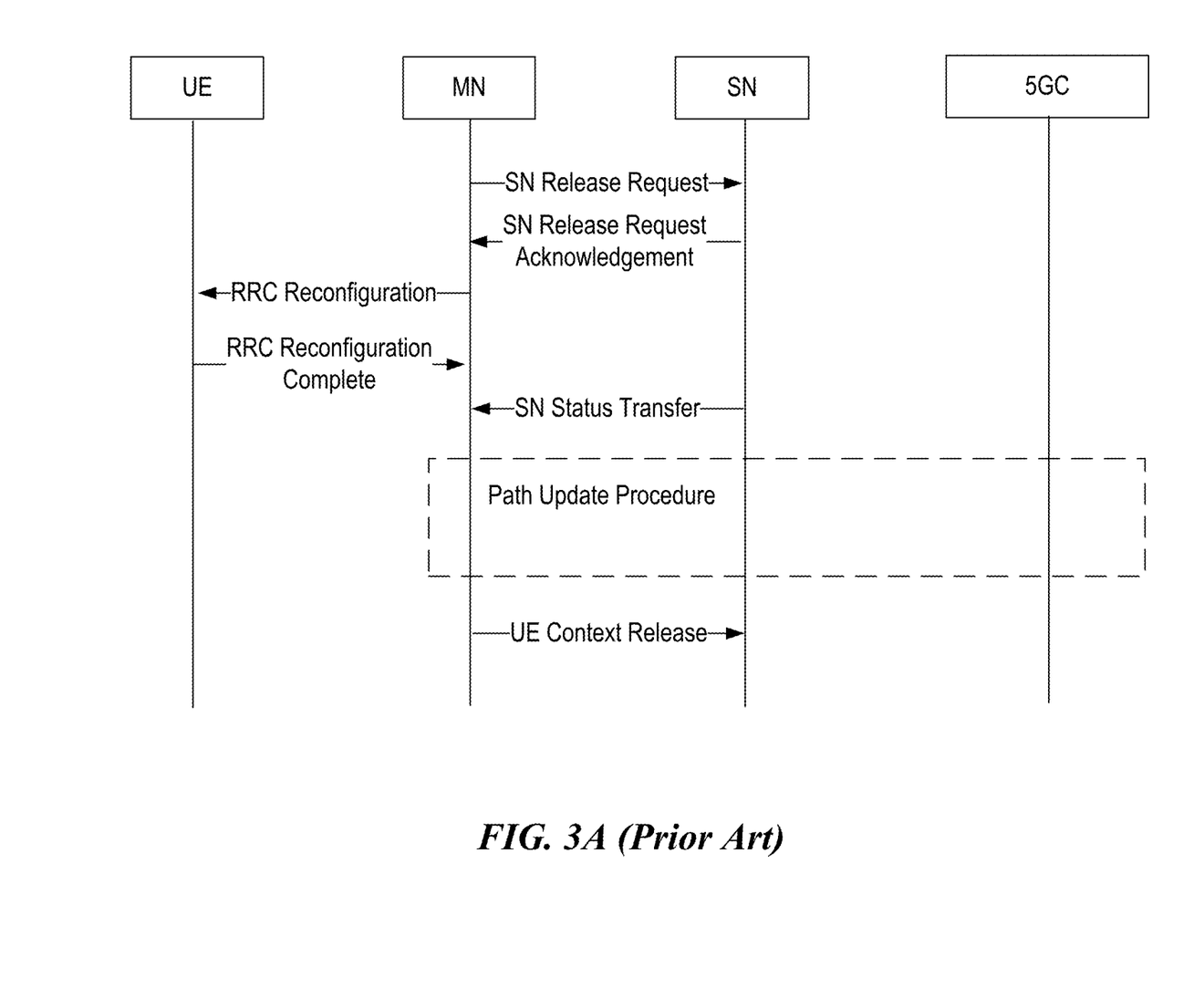
FIG. 3A illustrates an example Master Node (MN)-initiated SN release procedure.
Figure 3B:
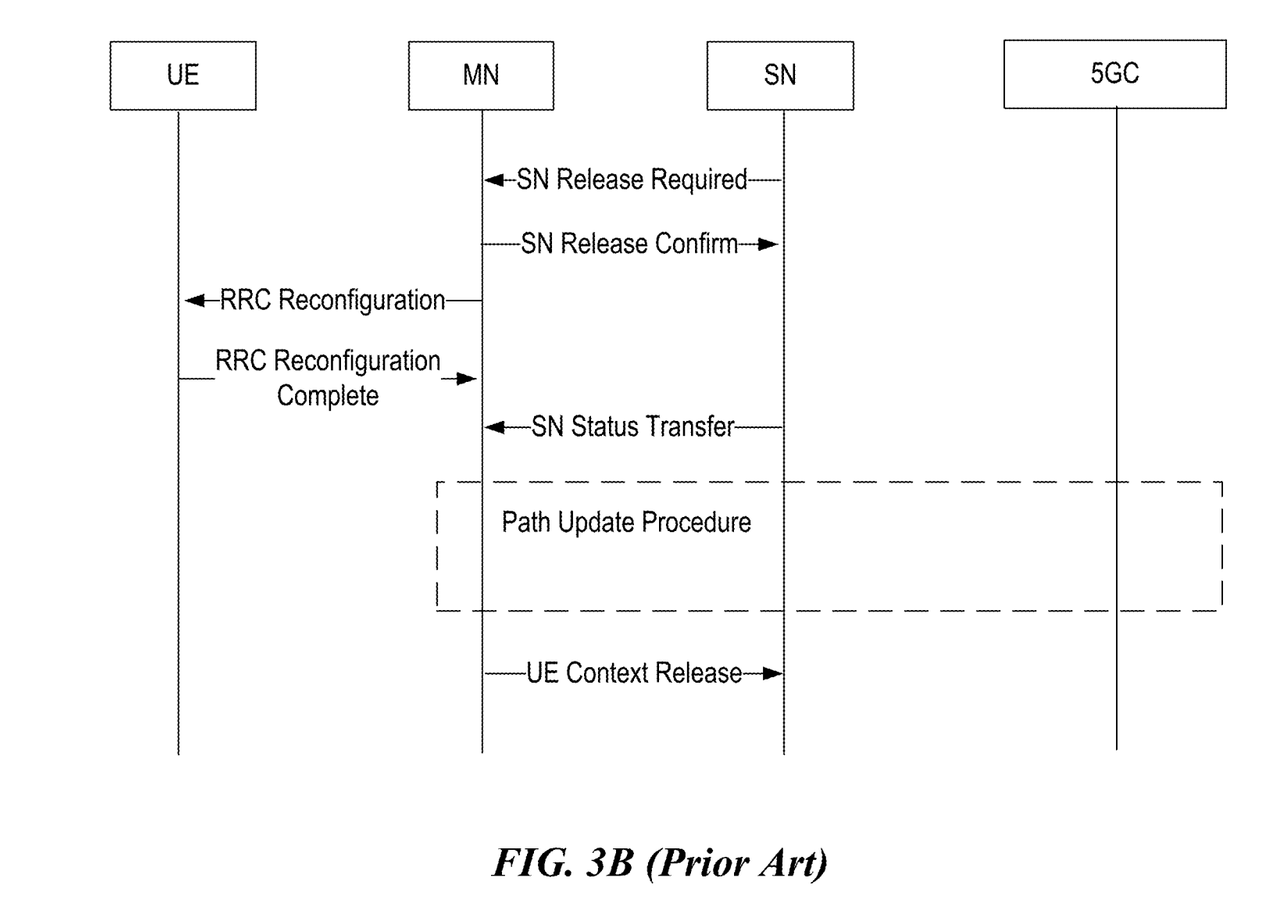
FIG. 3B illustrates an example SN-initiated SN release procedure.

When the UE moves out of the FR2 coverage, the SN can be released, ending the FR1-FR2 Dual Connectivity. A SN Release procedure can be initiated either by the MN or by the SN and is used to initiate the release of the UE context at the SN. FIG. 3A illustrates an example MN-initiated SN release procedure. The MN initiates the procedure by sending the SN Release Request message. The SN confirms SN Release by sending the SN Release Request Acknowledge message. The MN can optionally indicate in the MN RRCConnectionReconfiguration message towards the UE that the UE shall release the entire SCG configuration. The SN sends the SN Status Transfer for certain bearers. If applicable, the path update procedure is initiated. Upon reception of the UE Context Release message, the SN releases radio and C-plane related resources associated to the UE context. FIG. 3B illustrates an example SN-initiated SN release procedure. In this case, The SN initiates the procedure by sending the SN Release Required message which does not contain internode message. If applicable, the MN provides data forwarding addresses to the SN in the SN Release Confirm message. The remaining procedure is similar to what is depicted in FIG. 3A.

Referring back to FIG. 1, once the SN released, the UE 110 goes back to the single connectivity mode. Currently, the SN release procedure is triggered based on Radio Link Failure (RLF) 121 at the SN. However, when the RLF 121 occurs, the link recovery procedure is triggered and the FR1-FR1 CA mode in which the UE previously operated can no longer be properly restored, thereby causing bandwidth loss or reduction that can potentially impact communication quality and user experience when the UE 110 operates in the single-connectivity mode. This patent document discloses techniques to restore carrier aggregation in single connectivity to ensure the optimal bandwidth and throughput for the UE. In particular, instead of solely relying on RLF as the trigger event, the SN release can be triggered by measurement events 123 so that the SN can be released gracefully, thereby enabling the MN to restore FR1-FR1 CA for the UE once it goes back to single connectivity mode.

Figure 4:
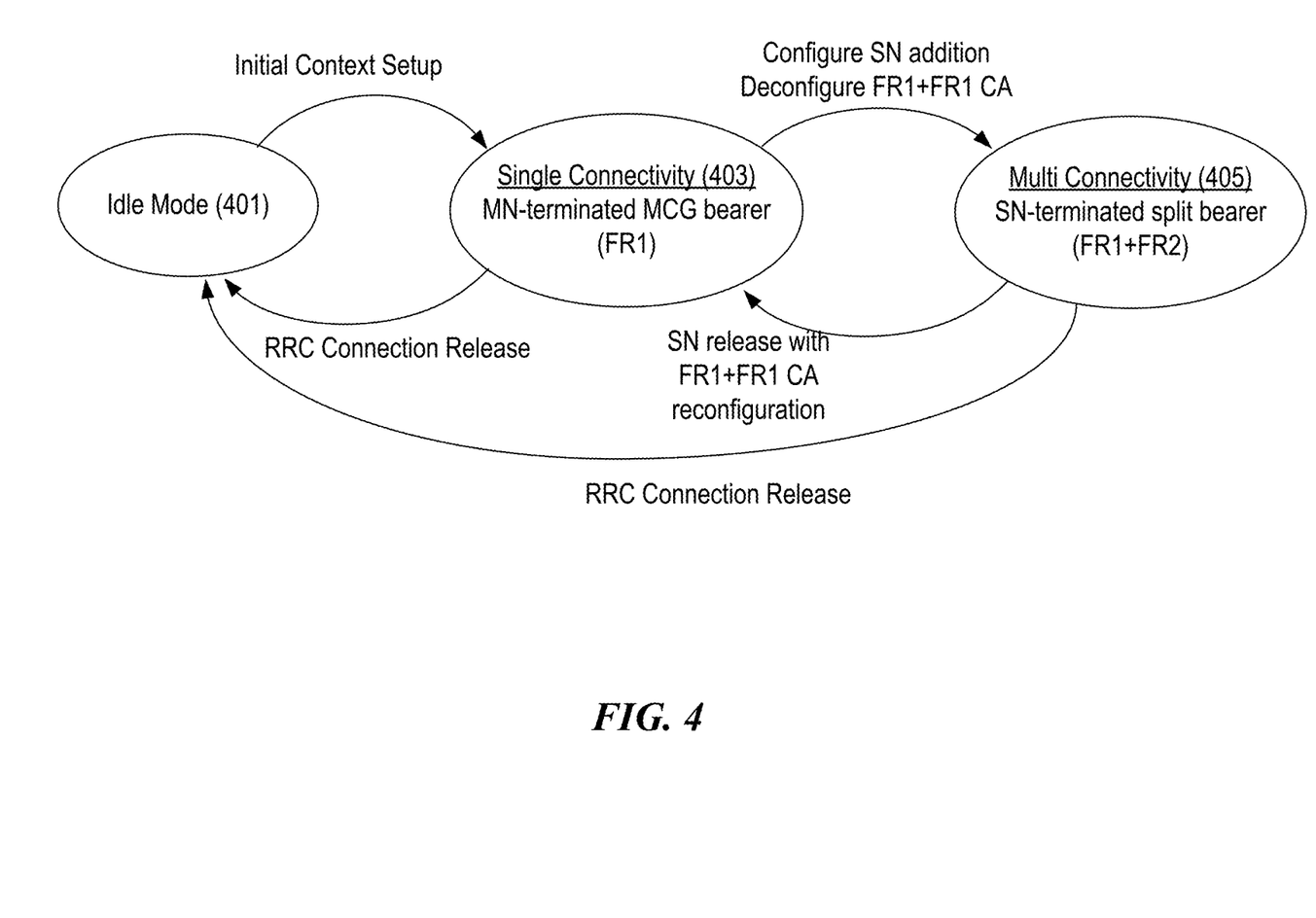
FIG. 4 illustrates an example state machine diagram of a user equipment (UE) in accordance with one or more embodiments of the present technology.

FIG. 4 illustrates an example state machine diagram of a user equipment (UE) in accordance with one or more embodiments of the present technology. The UE is initially in an idle mode 401. Upon the initial context setup, the UE establishes a connection with the MN using single connectivity (403) on FR1. Based on UE's capability, the UE can also be configured with FR1+FR1 CA for subsequent communications (e.g., based on secondary cell reselection on the same FR1). A MN-terminated MCG bearer can be established for transmission between the UE and the MN. The UE can go back to the idle mode 401 from the single connectivity mode 403 if communication is no longer needed.

Once in the connected mode in single connectivity, the UE can derive cell measurement results by measuring one or multiple beams associated with individual cells as configured by the network. For example, The UE can be configured with measurement report triggering events (e.g., Event A3, A4, A5 as defined in the 3GPP standard). Take Event A4 as an example, the UE can be configured with a4-Threshold defined within reportConfigNR Information Element (IE) of the RRC signaling to determine when the neighbor cell signal becomes better. The measurements can be expressed in dBm in case of Reference Signal Received Power (RSRP) or in dB in case of Reference Signal Received Quality (RSRQ) or Signal to Noise plus Interference Ratio (SINR).

If the UE supports multi-connectivity and moves into coverage area that supports both FR1 and FR2, the UE can be configured to remove the FR1+FR1 CA configuration and add a secondary node to operation in multi-connectivity mode (405) on both FR1 and FR2. In some embodiments, an SN-terminated split bearer can be established for transmission between the UE and the MN and SN. Based on the SN addition, the UE can be configured with different measurement report triggering events. For example, the previous measurement configuration (e.g., A4 event) for single-connectivity can be removed, and different threshold values can be provided to trigger various events for dual-/multi-connectivity. For example, the UE can be configured with a2-Threshold defined within reportConfigNR of the RRC signaling to determine when the serving cell becomes worse than a threshold.

In some cases, an SN release procedure is triggered for the UE to go back to operating in the single connectivity mode (403). For example, the SN release procedure can be triggered by previously configured measurement events, such as A2 event or other RSRP/RSRQ/SINR based events. The UE can be configured to release the SN for FR1+FR2 dual connectivity. With the graceful release of FR1+FR2 DC triggered by measurement events, the FR1+FR1 CA configuration can be restored for the UE (e.g., in the RRC Reconfiguration message to the UE as shown in FIGS. 3A-3B) so that optimal bandwidth can be used by the UE for transmissions using single connectivity. For example, the FR1+FR1 CA configuration can be specified by the sCellToAddModList IE of the RRC Reconfiguration message (e.g., as part of frequencyBandList) to allow the FR1+FR1 CA to be restored. Previously configured measurement events for single-connectivity can be added back for the UE as well.

Figure 5A:
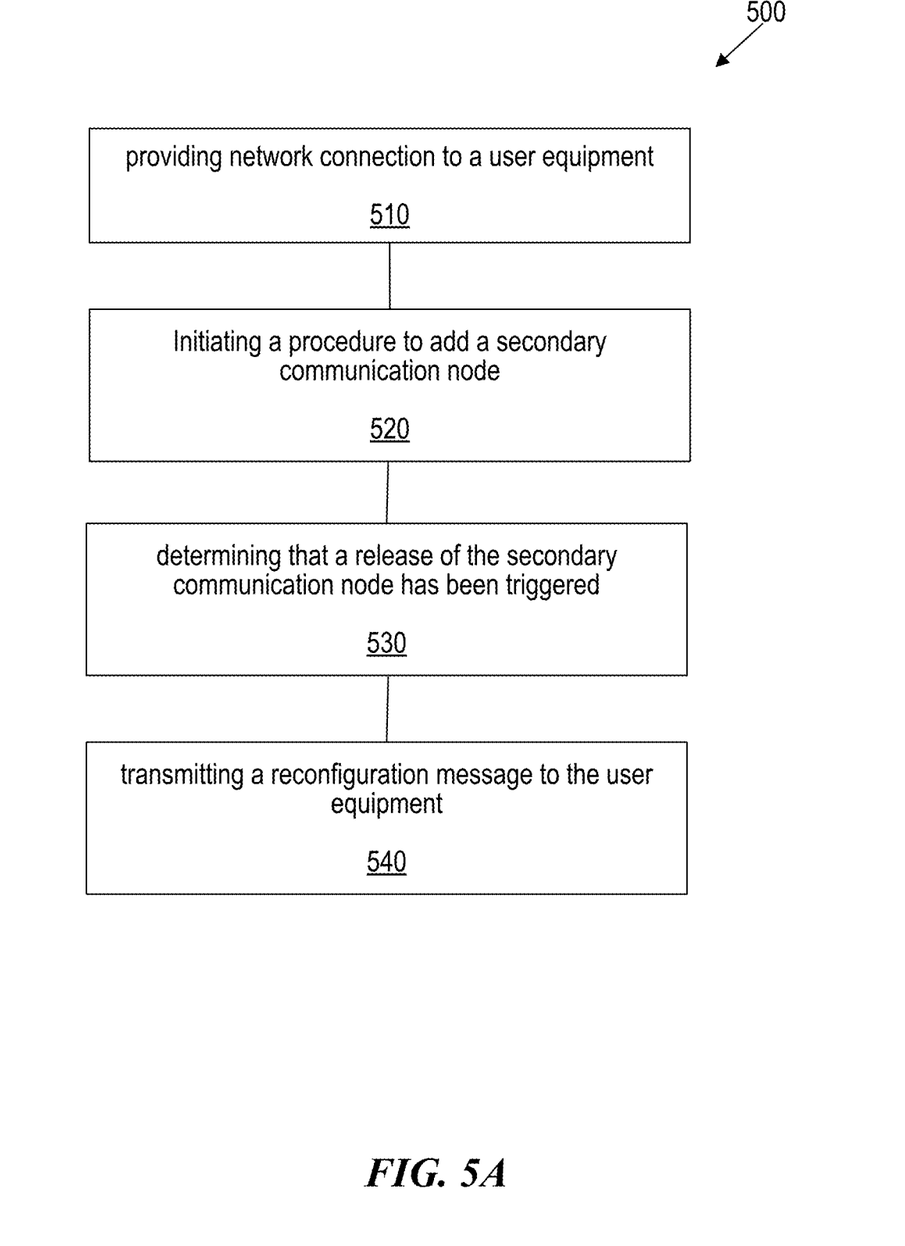
FIG. 5A is a flowchart representation of a method for wireless communication in accordance with one or more embodiments of the present technology.

FIG. 5A is a flowchart representation of a method 500 for wireless communication in accordance with one or more embodiments of the present technology. The method 500 includes, at operation 510, providing, by a master communication node, network connection to a user equipment (UE). The UE operates in a single connectivity mode. The mobile device is configured to use a carrier aggregation of two or more carriers in a first frequency range (e.g., FR1) associated with the master communication node.

The method 500 includes, at operation 520, initiating, by the master communication node, a procedure to add a secondary communication node. The procedure (e.g., the SN addition procedure shown in FIG. 2) configures the UE to disable or remove the carrier aggregation of two or more carriers in the first frequency range, and to operate in a dual connectivity mode using the first frequency range (e.g., FR1) associated with the master communication node and a second frequency range (e.g., FR2) associated with the secondary communication node.

The method 500 includes, at operation 530, determining, by the master communication node, that a release of the secondary communication node has been triggered. The release of the secondary communication node is triggered upon the master communication node or the secondary communication node determining a noise level (e.g., RSRP/RSRQ/SINR) on the second frequency range exceeding a predefined threshold. For example, intra- and inter-frequency RSRP, RSRQ, and SINR accuracy requirements for FR2 can be found in the 3GPP standard TS 38.133. As another example, the release of the secondary communication node can be triggered upon the detection of the A2 event, which can be used to trigger a mobility procedure when a UE moves towards cell edge.

The method 500 also includes, at operation 540, transmitting, by the master communication node, a reconfiguration message to the user equipment to configure the mobile device to operate in the single connectivity mode with the carrier aggregation of two or more carriers in the first frequency range restored.

As discussed above, the first frequency range can be designated as FR1 having a frequency range of 410 MHz-7125 MHz, and the second frequency range can be designated as FR2 having a frequency range of 24250 MHz-52600 MHz. The master communication node and the secondary communication node are communication nodes for New Radio (NR) communications. That is, the dual connectivity mode is designated as NR-DC. However, similar techniques can also be adopted in other dual connectivity scenarios, such as E-UTRA-NR Dual Connectivity (DN-DC) and/or NG-RAN E-UTRA-NR Dual Connectivity (NGEN-DC).

Figure 5B:
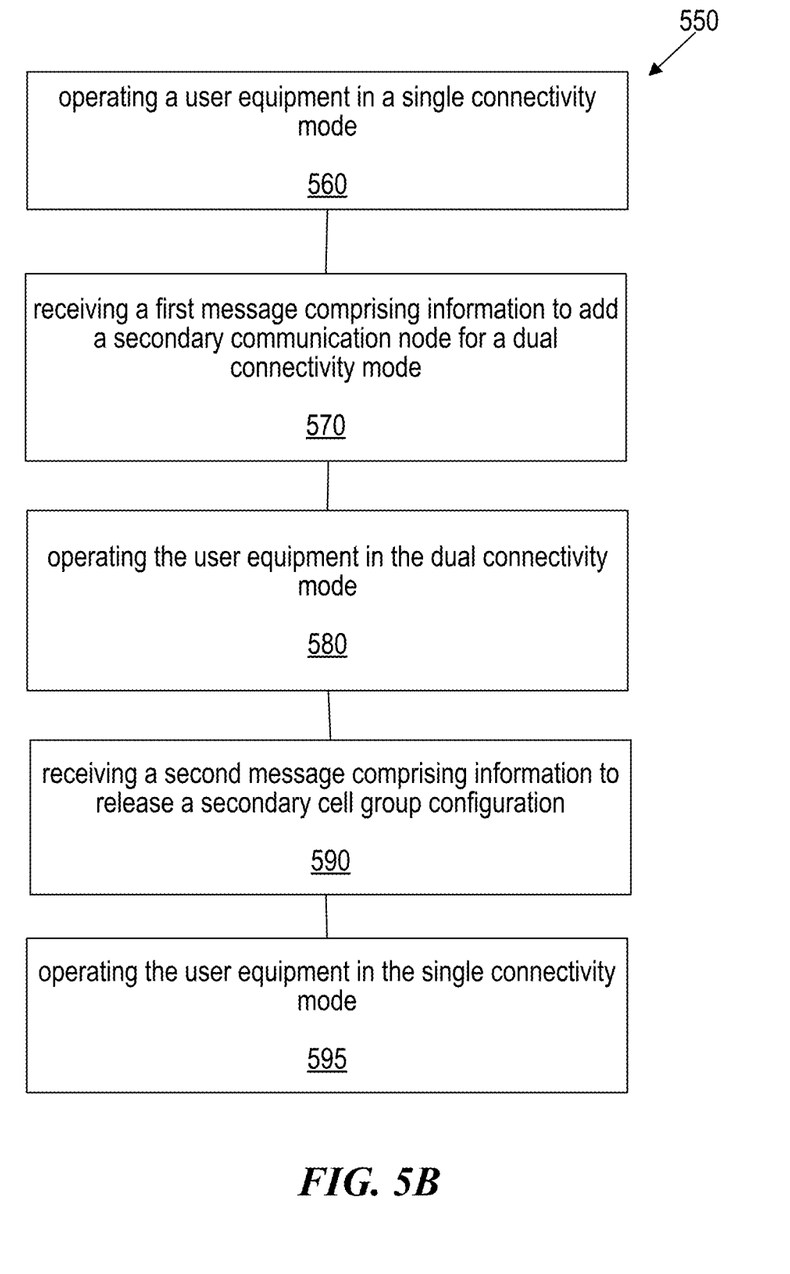
FIG. 5B is a flowchart representation of a method for wireless communication in accordance with one or more embodiments of the present technology.

FIG. 5B is a flowchart representation of a method 550 for wireless communication in accordance with one or more embodiments of the present technology. The method 550 includes, at operation 560, operating a user equipment in a single connectivity mode using a carrier aggregation of two or more carriers in a first frequency range associated with a master communication node. The method 450 includes, at operation 470, receiving, by the user equipment, a first message. The first message includes information to configure the user equipment to disable or remove the carrier aggregation of two or more carriers in the first frequency range and to operate in a dual connectivity mode using the first frequency range associated with the master communication node and a second frequency range associated with a secondary communication node. The method 450 includes, at operation 480, operating the user equipment in the dual connectivity mode.

The method 450 includes, at operation 490, receiving, by the user equipment, a second message comprising information to release a secondary cell group configuration associated with the secondary communication node (e.g., RRC Reconfiguration message in the SN release procedure as shown in FIGS. 3A-3B). The method 450 also includes, at operation 495, operating the user equipment in the single connectivity mode using the carrier aggregation of two or more carriers in the first frequency range with the carrier aggregation of two or more carriers in the first frequency range restored.

Wireless Communications System

Figure 6:
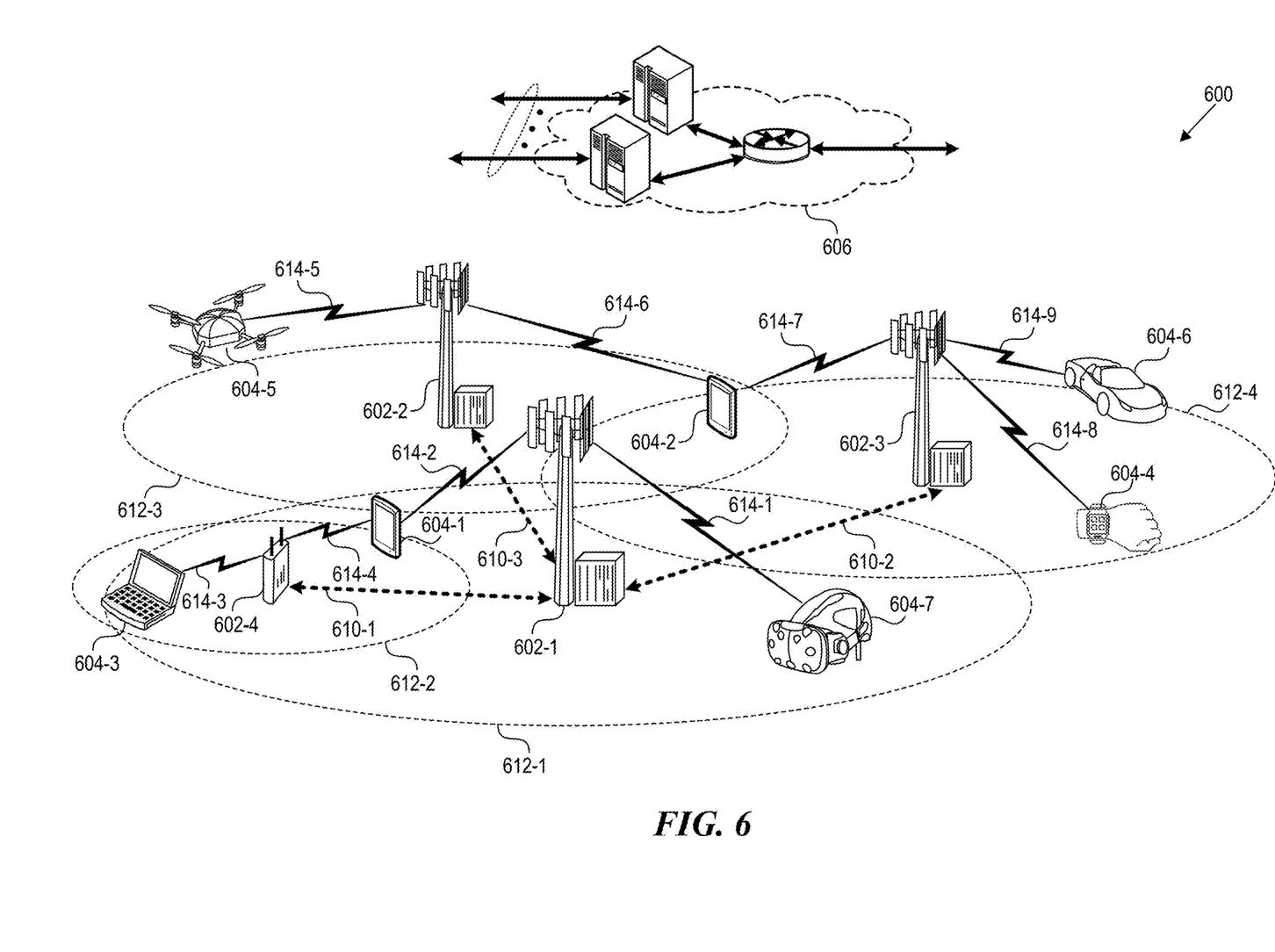
FIG. 6 is a diagram that illustrates a wireless telecommunication network in which aspects of the disclosed technology are incorporated.

FIG. 6 is a diagram that illustrates a wireless telecommunication network 600 ("network 600") in which aspects of the disclosed technology are incorporated. The network 600 includes base stations 602-1 through 602-4 (also referred to individually as "base station 602" or collectively as "base stations 602"). A base station is a type of network access node (NAN) that can also be referred to as a cell site, a base transceiver station, or a radio base station. The network 600 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 600 formed by the network 600 also include wireless devices 604-1 through 604-7 (referred to individually as "wireless device 604" or collectively as "wireless devices 604") and a core network 606. The wireless devices 604-1 through 604-7 can correspond to or include network 600 entities capable of communication using various connectivity standards. For example, a 5G communication channel can use millimeter wave (mmW) access frequencies of 28 GHz or more. In some implementations, the wireless device 604 can operatively couple to a base station 602 over a long-term evolution/long-term evolution-advanced (LTE/LTE-A) communication channel, which is referred to as a 4G communication channel.

The core network 606 provides, manages, and controls security services, user authentication, access authorization, tracking, Internet Protocol (IP) connectivity, and other access, routing, or mobility functions. The base stations 602 interface with the core network 606 through a first set of backhaul links (e.g., 51 interfaces) and can perform radio configuration and scheduling for communication with the wireless devices 604 or can operate under the control of a base station controller (not shown). In some examples, the base stations 602 can communicate with each other, either directly or indirectly (e.g., through the core network 606), over a second set of backhaul links 610-1 through 610-3 (e.g., X1 interfaces), which can be wired or wireless communication links.

The base stations 602 can wirelessly communicate with the wireless devices 604 via one or more base station antennas. The cell sites can provide communication coverage for geographic coverage areas 612-1 through 612-4 (also referred to individually as "coverage area 612" or collectively as "coverage areas 612"). The geographic coverage area 612 for a base station 602 can be divided into sectors making up only a portion of the coverage area (not shown). The network 600 can include base stations of different types (e.g., macro and/or small cell base stations). In some implementations, there can be overlapping geographic coverage areas 612 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 600 can include a 5G network 600 and/or an LTE/LTE-A or other network. In an LTE/LTE-A network, the term eNB is used to describe the base stations 602, and in 5G new radio (NR) networks, the term gNBs is used to describe the base stations 602 that can include mmW communications. The network 600 can thus form a heterogeneous network 600 in which different types of base stations provide coverage for various geographic regions. For example, each base station 602 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 600 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 600 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 600 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 604 and the base stations 602 or core network 606 supporting radio bearers for the user plane data. At the Physical (PHY) layer, the transport channels are mapped to physical channels.

Wireless devices can be integrated with or embedded in other devices. As illustrated, the wireless devices 604 are distributed throughout the system 600, where each wireless device 604 can be stationary or mobile. For example, wireless devices can include handheld mobile devices 604-1 and 604-2 (e.g., smartphones, portable hotspots, tablets, etc.); laptops 604-3; wearables 604-4; drones 604-5; vehicles with wireless connectivity 604-6; head-mounted displays with wireless augmented reality/virtual reality (AR/VR) connectivity 604-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 604-1, 604-2, 604-3, 604-4, 604-5, 604-6, and 604-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 600 equipment at the edge of a network 600 including macro eNBs/gNBs, small cell eNBs/gNBs, relay base stations, and the like. A wireless device can also communicate with other wireless devices either within or outside the same coverage area of a base station via device-to-device (D2D) communications.

The communication links 614-1 through 614-9 (also referred to individually as "communication link 614" or collectively as "communication links 614") shown in network 600 include uplink (UL) transmissions from a wireless device 604 to a base station 602, and/or downlink (DL) transmissions from a base station 602 to a wireless device 604. The downlink transmissions can also be called forward link transmissions while the uplink transmissions can also be called reverse link transmissions. Each communication link 614 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 614 can transmit bidirectional communications using frequency division duplex (FDD) (e.g., using paired spectrum resources) or Time division duplex (TDD) operation (e.g., using unpaired spectrum resources). In some implementations, the communication links 614 include LTE and/or mmW communication links.

In some implementations of the network 600, the base stations 602 and/or the wireless devices 604 include multiple antennas for employing antenna diversity schemes to improve communication quality and reliability between base stations 602 and wireless devices 604. Additionally or alternatively, the base stations 602 and/or the wireless devices 604 can employ multiple-input, multiple-output (MIMO) techniques that can take advantage of multi-path environments to transmit multiple spatial layers carrying the same or different coded data.

Computer System

Figure 7:
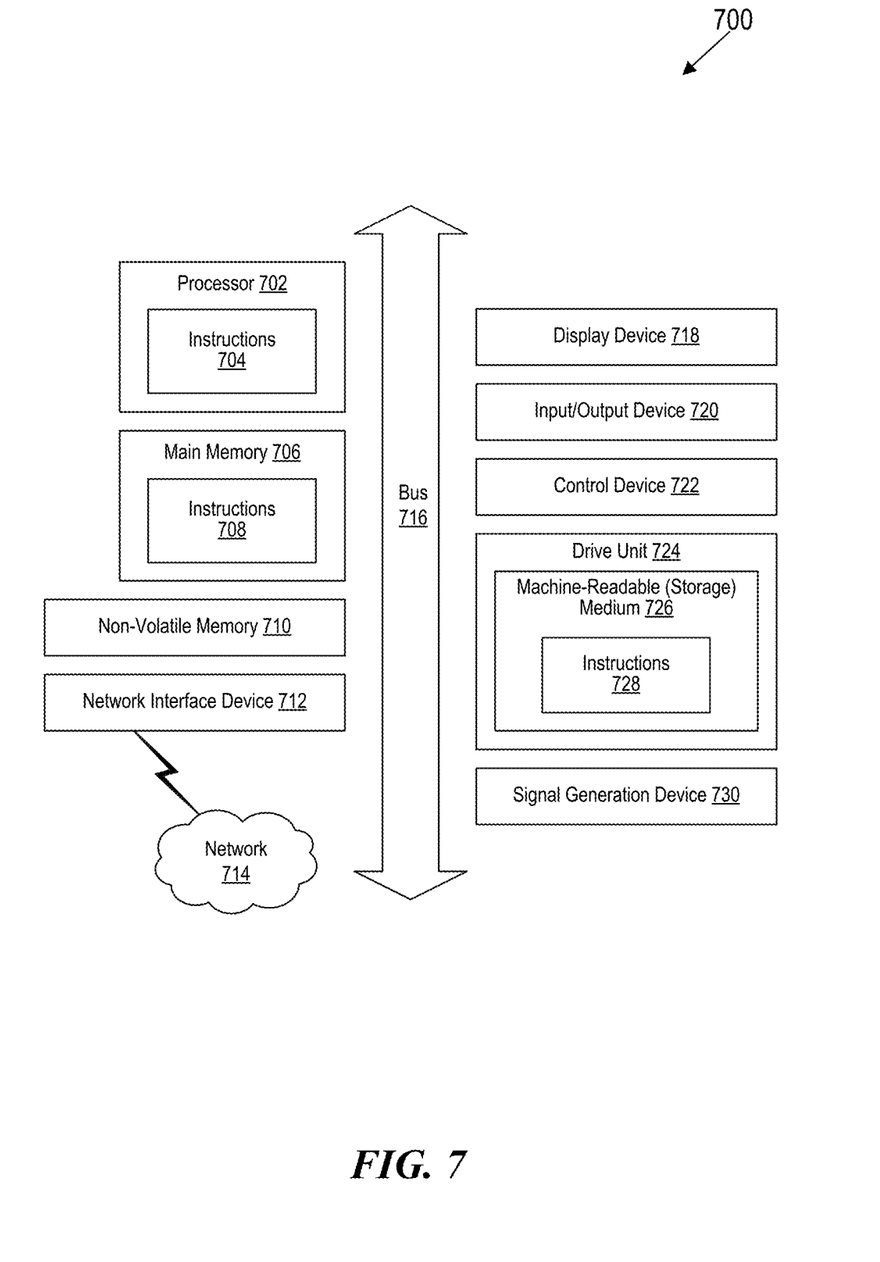
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

It is thus appreciated that the techniques disclosed herein can be implemented in various embodiments of dual-/multi-connectivity to single-connectivity transitions to ensure that carrier aggregation, if previously have been adopted, can be restored so as to provide optimal bandwidth and transmission rates for the UEs.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method for wireless communication, comprising:
providing, by a master communication node, network connection to a mobile device that operates in a single connectivity mode,
  wherein the mobile device is configured to use a carrier aggregation of two or more carriers in a first frequency range associated with the master communication node;
initiating, by the master communication node, a procedure to add a secondary communication node,
  wherein the procedure configures the mobile device to:
    (1) disable the carrier aggregation of two or more carriers in the first frequency range, and
    (2) operate in a dual connectivity (DC) mode using the first frequency range associated with the master communication node and a second frequency range associated with the secondary communication node;
determining, by the master communication node, that a release of the secondary communication node has been triggered; and
transmitting, by the master communication node, a reconfiguration message to the mobile device to configure the mobile device to operate in the single connectivity mode with the carrier aggregation of two or more carriers in the first frequency range restored.

2. The method of claim 1, wherein the master communication node and the secondary communication node are communication nodes for New Radio (NR) communications, and wherein the dual connectivity mode is designated as NR-DC.

3. The method of claim 1, wherein the first frequency range is designated as FR1 having a frequency range of 410 MHz-7125 MHz, and wherein the second frequency range is designated as FR2 having a frequency range of 24250 MHz-52600 MHz.

4. The method of claim 1, wherein the release of the secondary communication node is triggered upon the master communication node or the secondary communication node determining a noise level on the second frequency range exceeding a predefined threshold.

5. The method of claim 4, wherein the noise level is determined based on Reference Signal Received Power (RSRP), Reference Signal Received Quality (RSRQ) or Signal to Noise plus Interference Ratio (SINR).

6. The method of claim 1, wherein the reconfiguration message comprises a Radio Resource Configuration (RRC) Reconfiguration message, the RRC Reconfiguration message further comprising information to configure the mobile device to release a secondary cell group configuration associated with the secondary communication node.

7. A method for wireless communication, comprising:
operating a user equipment in a single connectivity mode using a carrier aggregation of two or more carriers in a first frequency range associated with a master communication node;
receiving, by the user equipment, a first message,
  wherein the first message comprises information to configure the user equipment to:
    (1) disable or remove the carrier aggregation of two or more carriers in the first frequency range, and
    (2) operate in a dual connectivity mode using the first frequency range associated with the master communication node and a second frequency range associated with a secondary communication node;
operating the user equipment in the dual connectivity mode;
receiving, by the user equipment, a second message comprising information to release a secondary cell group configuration associated with the secondary communication node; and
operating the user equipment in the single connectivity mode using the carrier aggregation of two or more carriers in the first frequency range.

8. The method of claim 7, comprising:
performing, by the user equipment, measurements while operating in the dual connectivity mode; and
transmitting, by the user equipment, the measurements to at least one of the master communication node or the secondary communication node.

9. The method of claim 8, wherein the receiving of the second message is triggered by a noise level exceeding a predefined threshold indicated the measurements reported by the user equipment.

10. The method of claim 8, wherein the measurements comprises at least one of Reference Signal Received Power (RSRP), Reference Signal Received Quality (RSRQ), or Signal to Noise plus Interference Ratio (SINR).

11. The method of claim 7, wherein the master communication node and the secondary communication node are communication nodes for New Radio (NR) communications, and wherein the dual connectivity mode is designated as NR-DC.

12. The method of claim 7, wherein the first frequency range is designated as FR1 having a frequency range of 410 MHz-7125 MHz, and wherein the second frequency range is designated as FR2 having a frequency range of 24250 MHz-52600 MHz.

13. A wireless communication device, comprising a processor that is configured to:
determine, for a user equipment that operates in a dual connectivity mode using a first frequency range associated with the wireless communication device and a second frequency range associated with a secondary device, that a release of a secondary communication node has been triggered;

determine that the user equipment previously operated in a single connectivity mode using a carrier aggregation of two or more carriers in the first frequency range associated with the wireless communication device; and transmit a message to the user equipment to reconfigure the user equipment to use the carrier aggregation of two or more carriers in the first frequency range.

14. The wireless communication device of claim 13, wherein the processor is configured to determine that the release of the secondary communication node has been triggered based on measurements reported by the user equipment.

15. The wireless communication device of claim 13, wherein the processor is configured to initiate a request to add the secondary device to enable the user equipment to operate in a dual connectivity mode.

16. The wireless communication device of claim 13, wherein the message is a Radio Resource Configuration (RRC) Reconfiguration message.

17. The wireless communication device of claim 13, wherein the first frequency range is designated as FR1 having a frequency range of 410 MHz-7125 MHz, and wherein the second frequency range is designated as FR2 having a frequency range of 24250 MHz-52600 MHz.

18. The wireless communication device of claim 13, wherein the two or more carriers are located in a same frequency band in the first frequency range.

19. The wireless communication device of claim 13, wherein the two or more carriers are located in different frequency bands in the first frequency range.

20. The wireless communication device of claim 13, wherein both the wireless communication device and the secondary device are configured to provide network access to the user equipment using New Radio (NR) technology.

* * * * *